3,538,337
PHOTOMETRIC DEVICE WITH PHOTOCELL
COMPENSATING MEANS
Jiří Hrdina, Prague, Czechoslovakia, assignor to Ceskoslovenska akademie ved, Prague, Czechoslovakia
Filed July 6, 1967, Ser. No. 651,449
Int. Cl. G01n 21/16
U.S. Cl. 250—218                                    4 Claims

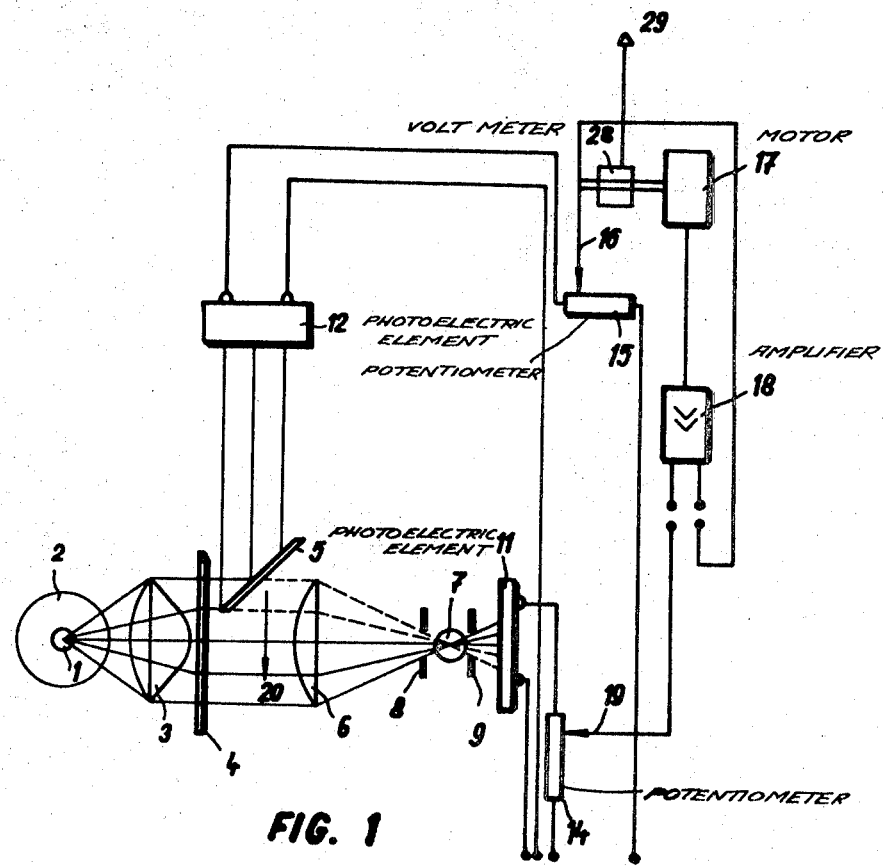
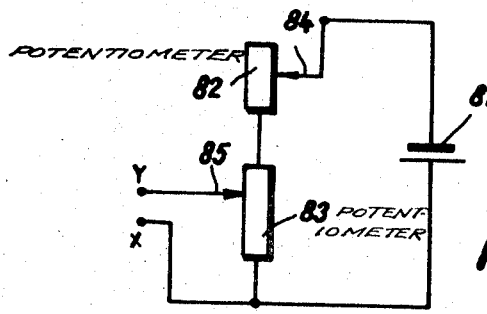
FIG. 1
FIG. 2

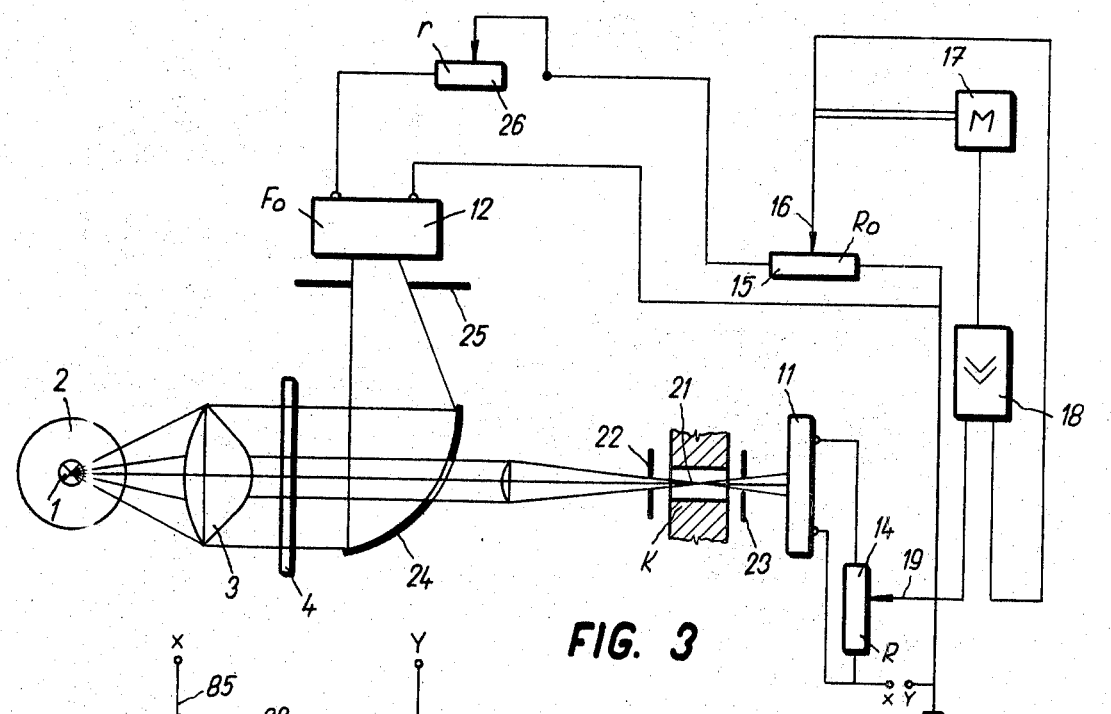
FIG. 3
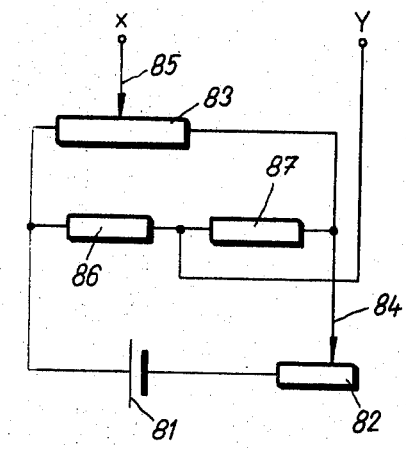
FIG. 4
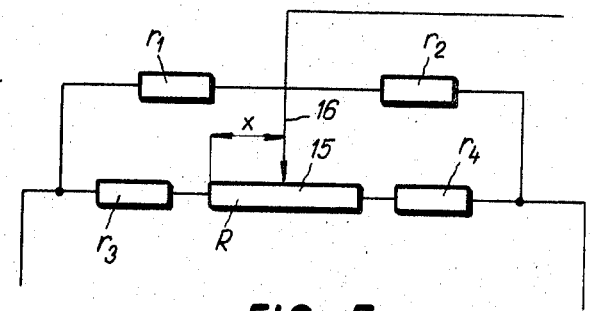
FIG. 5
INVENTOR.
JIRI HRDINA
BY
Attorney United States Patent Office 3,538,337
Patented Nov. 3, 1970

ABSTRACT OF THE DISCLOSURE

A photometric aggregate for analyzing the contents of a cuvette by illumination by a light from a single source, the said light is converted into a beam of parallel rays and split by a reflecting element, the split beams are fully utilized by a main photoelectric sensor and a reference photoelectric sensor, the main photoelectric sensor receives a light beam emerging from the cuvette while the reference photoelectric sensor receives a direct light beam, an electric circuit associated with each sensor, the voltage difference of the output of the two circuits is used to drive a balancing motor adapted to move the slider of a potentiometer included in the circuit of the reference photoelectric sensor to cancel out said voltage difference.

BACKGROUND OF THE INVENTION

This invention relates to an improved photometric aggregate which is adapted to measure or automatically plot the course of photometric effects of the extinction of conditions in a cuvette in such a manner that the inaccuracies of the known apparatus are substantially reduced. In the novel apparatus according to the invention the effect of undesired deviations from the relatively simple theoretical values is suppressed, on one hand, by utilizing new relations between the values of the individual elements of the entire aggregate and, on the other hand, by a new arrangement of the elements. These deviations are, according to the invention, utilized for the total or partial compensation of other undesired deviations, particularly in the photometry of cuvettes having a long flow length and small transparency, as, for example, in the highly effective automatic analyzers for amino acids and the like. The invention makes possible the increase of sensitivity and selectivity of the photometric aggregate compared to devices known heretofore and at the same time permits a substantial compensation of the interfering effects which normally prevent the application of known processes and apparatus.

In the known photometric aggregates all possible means have been resorted to in order to satisfy the requirements for obtaining a constricted light beam for the final purpose. The photometric aggregate, according to the invention, makes possible a maximum and optimal use of the light beam while taking into account a number of aspects, some of them were already mentioned hereinabove while others will be treated in the ensuing specification.

SUMMARY OF THE INVENTION

According to the invention, the indicated purpose is achieved with a photometric system having a main and a reference photo element. A light beam from a light source impinges on the main photo element after passing through the cuvette, while the reference photo element receives from the same light source another light beam that does not pass through the cuvette. Both photo elements generate a voltage, the ratio of which is measured and automatically recorded by means of a compensating millivolt meter.

Briefly stated, according to the invention, there is disposed in the path of the light beam, generated for both photo elements by a filament of a light bulb, an optical element which converts the light into a beam of substantially parallel rays. In this beam there is disposed a filter and subsequently a reflecting element which divides the entire filtered beam in such a manner that the entire light that has passed through the optical element and the filter is utilized by the two aforenoted photo elements. The ratio of the two light beams may be controlled by means of the said reflecting element and may be finely adjusted by a slit. Further, the respective circuits of the main photo element and the reference photo element include respective potentiometers with sliding contact. The position of the slider of the potentiometer associated with the reference photo element affects an indicating or recording device. The indicating or recording is effectuated in the moment of compensating the voltage on the slider of the potentiometer associated with the main photo element by means of the voltage at the slider of the compensating potentiometer associated with the reference photo element. It is advantageous to interconnect the poles of the two photo elements directly or through a source of small compensating voltage. The slider associated with the compensating photometer is preferably connected to one end of the potentiometer through a resistance to obtain a further correcting effect which would depend on the magnitude of extinction of the contents of the cuvette. The ratio of the resistance of the potentiometer associated with the main photo element to that of the compensating potentiometer should be the same as the ratio of the intensity of light associated with the main photo element to that associated with the reference photo element.

According to the invention the aggregate is preferably constructed in such a manner that the mechanical driving means between the slider of the compensating potentiometer and the indicating or recording device is changeable and provides an adjustable final correction between the corresponding positions of the slider and the device. The extent of this final correction depends upon the position of the slider on the compensating potentiometer which position, in turn, is a function of the concentration of the material to be photometrically measured.

BRIEF DESCRIPTION OF THE DRAWINGS

FIG. 1 is a schematic diagram showing of the optical and electrical elements of the photometric aggregate associated with a cuvette through which the light beam passes normal to its longitudinal axis;

FIG. 3 is a schematic diagram of a photometric aggregate particularly adapted for long and narrow cuvettes through which the beam enters parallel with the fluid flow;

FIGS. 2 and 4 are diagrams of components connectable to the system of FIGS. 1 and 3 adapted to induce deviations from the proportionality to compensate those deviations from the proportionality that result from other causes;

FIG. 5 shows a detail of a further embodiment including additional elements to affect the proportionality of the output of the main potentiometer and FIG. 6 shows a modified form of the apparatus of FIG. 1.

DESCRIPTION OF THE EMBODIMENTS

Figure 6:
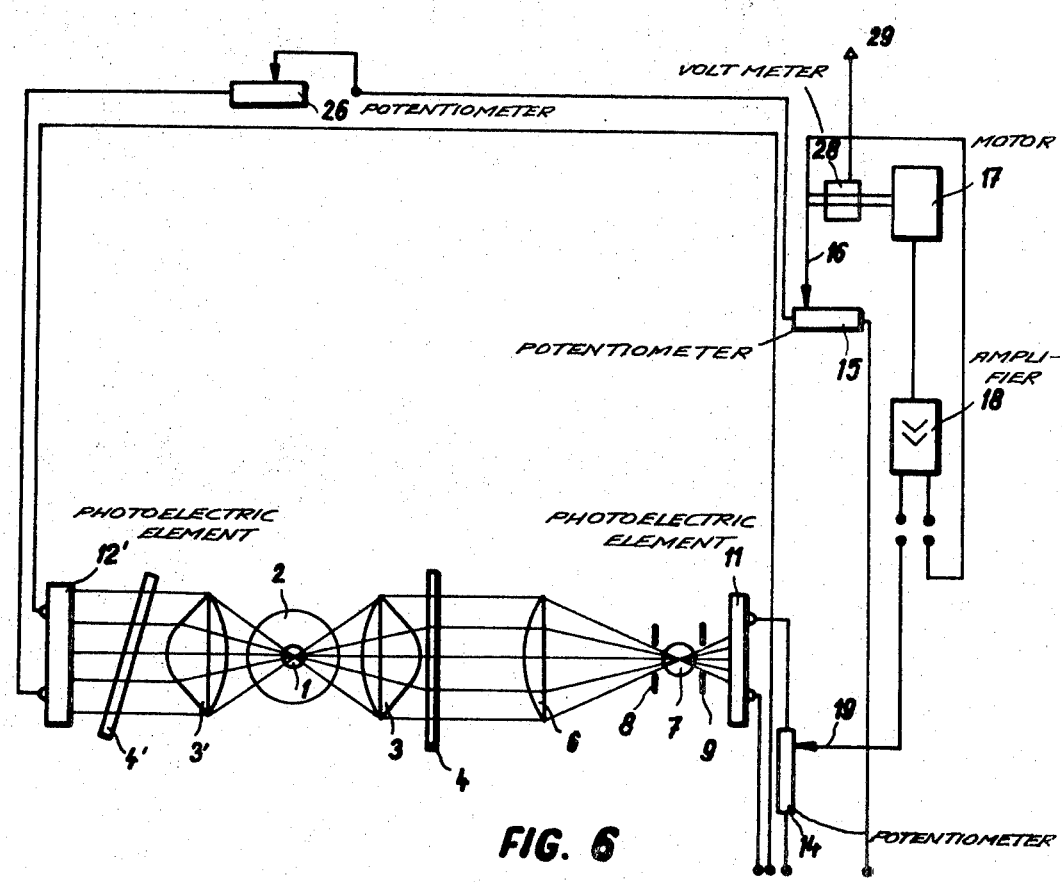

Turning first to the part of FIG. 1 which is outside the area enclosed with broken lines, the small filaments 1 of light bulb 2 emit a divergent light beam, one part of which is converted into a beam of substantially parallel light rays by means of an optical element 3, at least one optical surface of which is aspherical for correcting spherical aberrations. The converted light beam passes through the interference filter 4 and is thereafter divided into two parts by an optical reflecting element 5. One part of the divided beam is converted into a convergent beam by optical element 6 and forms a real image 7 of the light source 1, preferably close to the center of cuvette K. The beam may be advantageously further delimited by means of slits 8 and 9. The light beam thus constricted impinges, after having passed through the cuvette K, on the photoelectric element 11. The other part of the light beam is diverted by reflecting element 5 towards a second photoelectric element 12.

The electric current generated by the light beam impinging upon photoelectric element 11 causes a voltage drop in resistance 14. Similarly, the current flow caused by the light beam falling directly on photoelectric element 12 causes a voltage drop in the resistance of the measuring potentiometer 15 of a millivolt meter and recorder 28, 29. Associated with resistance 14 is a slider 16 displaceable by the balancing motor 17 responsive to A.C. signals from the amplifier 18. The amplifier 18, in turn, receives A.C. signals resulting from the modulation of the D.C. voltage between the slider 16 of the potentiometer 15 and the slider 19 of the potentiometer 14. The above-noted modulation of the direct voltage is non-stepped and corresponds to the change in position of slider 19. The position of rest of slider 16 depends on the ratio of the intensities of the light beams impinging on photoelectric elements 11 and 12 at the moment of extinction of the contents of cuvette K. The entire electro-mechanical system which causes the displacement of slider 16 on the measuring potentiometer 15 is arranged in a known manner characteristic of recording compensating millivolt meters. Thus, when a voltage difference appears between the sliders 16 and 19, motor 17 moves them in such a manner that the voltage difference gradually decreases until it becomes zero. When this occurs, the voltages across measuring potentiometer 15 and potentiometer 14 are identically divided by the respective sliders 16 and 19. Assuming that the electrical currents generated by the excited photoelectrical elements 11 and 12 are proportional to the intensities of the respective light beams, the entire apparatus is independent of the light intensity of lamp 2 and further, even with varying intensity of the lamp 2, the light beams impinging on photoelectrical elements 11 and 12 are exactly in proportion in case of unchanged extinction contents of the cuvette K. As a final practical result the photometric reaction of the entire aggregate is exactly proportional to the quantity (concentration) of the analyzed material. In order to approach in a high degree the theoretical accuracy of the apparatus, it is necessary that the individual deviations from the proportionality originating from independent causes have a mutual cancelling effect with respect to one another.

An exactly proportional light beam for the cuvette K and the photoelectric element 12 even in case of substantial variations in the voltage of the filament 1 of lamp 2 is achieved by ensuring that both light beams originate from the same single light beam subsequent to its filtration through the common filter 4 and its alignment into substantially parallel extending light rays.

In order to ensure that the two photoelectric elements 11 and 12 work approximately in the same sections of their characteristics while using possibly small resistances and while resistances 14 and 15 have approximately the same value, the requirement arises that the light beams impinging upon photoelectric elements 11 and 12 be approximately of equal intensity. The reason for keeping resistances at small values is to avoid work in the curved portion of the characteristics into which the working point would shift if larger resistances are used. Under these assumptions it is further required that the two light beams directed towards the photoelectric element 12 and cuvette K should be of equal intensity in the case where the cuvette K does not contain any absorbing solution or where the concentration of the absorbing material is disappearing. Under these assumptions it is usually required that the photometric aggregate record the base line close to one edge of the recording paper while recordings adjacent the opposed other edge correspond to a zero value of the light transmitted by the cuvette K. A zero light transmission by cuvette K theoretically corresponds to an infinitely large concentration of the material in the cuvette causing a total light absorption.

In order not to endanger the proportionality between the voltage of the resistance 14 and the light beam impinging upon the photoelectric element 11 it has been a practice for many years to choose for resistance 14 a maximum value of about 300 ohms. Further, the resistance of the measuring potentiometer 15 used with the usual recording compensating millivolt meters is usually between 200 and 300 ohms; technical difficulties arise when the use of a larger resistance is contemplated. In view of the foregoing it is required that in such apparatus the voltage across resistances 14 and 15 should be of such a large value as to satisfactorily comply with the requiremens necessary for a stable and undisturbed operation of the compensating recorder. Given the usual parameters of such recorders this requirement may be fulfilled even in the case of small cuvettes and light sources which are heated in such a manner that their life expectancy, when light bulbs of 10–30 watts (nominal power) are used, may be thousands of hours. Light sources of such power have a sufficiently centered and small filament so that if they are used in a suitable optical system, particularly one including at least one non-spherical surface, the above-noted conditions may be complied with. Under these assumptions it is first of all necessary that the aligned and filtered light beam be well utilized after its division into approximately equal beams directed towards photoelectric elements 11 and 12. To obtain the most advantageous division for the optimal utilization of the light beam, the reflecting element 5 is adjusted by displacing it to a greater or lesser extent in the direction of arrow 20, thus changing the ratio between the split light beams for the respective photoelectric elements 11 and 12.

The light beam emitted by light source 2 may be even better utilized by means of an alternative embodiment depicted in FIG. 6. This alternative embodiment includes an additional optical element 3′ and an additional filter 4′ for directing one part of the light beam which filament 1 emits in a direction opposite from the cuvette K.

An inequality in the spectral transparency of filters 4 and 4′ may be corrected by adjusting the inclination of the filter 4′ as shown in FIG. 6. In this alternate embodiment the reflecting element 5 and the photoelectric element 12 are omitted.

Both above-described versions of the apparatus of FIGS. 1 and 6 are adapted for photometric aggregates used with cuvettes which enable a beam of light rays strongly deflected toward their direction to pass therethrough in such a manner that this beam, which is angularly sufficiently wide and at its narrowest portion not too narrow may be efficiently utilized as it emerges from the cuvette.

In FIG. 3 there is schematically shown a circuit diagram of a photometric aggregate which utilizes the advantages of a long and narrow cuvette 21. The optically active or useful space of this cuvette may be radially further decreased by one or more slits 22 and 23. A cuvette of this type, which has a number of advantages particularly as far as light conductivity is concerned, permits the admission of only a very narrow light beam which, emerging from the cuvette, impinges upon the light sensitive sensor 11. Since cuvette 21 requires a narrow beam, only a central, axial portion of the entire light beam is used. The entire beam, as in the previous embodiments, is first transformed by the optical element 3 into a beam of approximately parallel rays that pass through the interference filter 4. The other portion of the beam which is only slightly smaller than the entire beam passing through the filter 4 is, as shown in FIG. 3, deflected by the hollow mirror 24 in such a manner that it impinges on the photoelectric element 12 either in its entirety or narrowed by slit 25. It is apparent that in such an arrangement, even in the presence of filter 4, the beam which impinges on photoelectric element 12 is of a sufficient intensity. Consequently, across the potentiometer 15 of the recording device a voltage will appear that is sufficiently large to ensure the stability of the entire system. In order to ensure that resistance 14 in the circuit of the photoelectric element 11 receives a voltage which is comparable to the voltage across the potentiometer 15, the resistance 14 should be substantially larger than the resistance 15 (preferably a multiple value thereof).

It has been customary, however, to choose a lesser value for resistance 14 than that of potentiometer 15 for fear of the consequencies of deviations from proportionality. This fear, as it developed, was unfounded since often one may work in those sections of the characteristic where the deviation from the linearity is negligible. In cases where the deviations are not negligible, measures can be taken to lower their effect to a negligible level, or to use these deviations as compensators of at least one part of further deviations from proportionality arising from other causes. This objective may be approached either by using known means in the selection of the parameters so that certain relations which ensure a compensation are maintained constant, or by the application of particular means, possibly in combination with the aforenoted utilization of parameters of known elements forming part of the entire aggregate.

Turning now to FIG. 2, there is shown a voltage correcting circuit comprising a voltage source 81. The current generated thereby and flowing through the serially connected potentiometers 82 and 83 may be controlled by varying the resistance of potentiometer 82 by means of slider 84. The small correcting voltage between the terminals X and Y is controlled with the slider 85 associated with potentiometer 83.

If it is required to vary both the positive and the negative value of the voltage between the terminals X and Y, a voltage divider formed by serially connected fixed equal resistances 86 and 87 is coupled parallel with potentiometer 83 (FIG. 4). The junction between the two resistances 86 and 87 is connected to the terminal Y, while slider 85 is connected to terminal X. In case slider 85 is in its central position on potentiometer 83, the potential difference between the two terminals X and Y is zero.

FIG. 5 shows the circuit diagram of additional correctional resistances for the main potentiometer 15. With the inclusion of the additional correcting resistances $r_1$ and $r_2$ in the circuit of potentiometer 15, the compensating voltage taken from the slider 16 is no longer a linear function of the relative distance X of the slider 16 from one end of the potentiometer 15 in case a constant voltage is applied to the terminals thereof. It is seen that the slider 16 is connected to one terminal of potentiometer 15 through serially connected resistances $r_1$ and $r_3$, and to the other terminal of potentiometer 15 through serially connected resistances $r_2$ and $r_4$. One may thus obtain a predetermined deformation of the voltage curve which may be affected by the ratio of the correcting resistance $r_1$ or $r_2$ to the resistance of potentiometer 15.

Although several embodiments of the invention have been depicted and described, it will be apparent that these embodiments are illustrative in nature and that a number of modifications in the apparatus and variations in its end use may be effected without departing from the spirit or scope of the invention as defined in the appended claims.

What is claimed is:

1. A photometric assembly of the type including a light source, a main photoelectric element and a reference photoelectric element, said main and reference elements being exposed to said light source, sample receiving means between said main element and said light source, said elements each generating an output signal in response to the intensity of light impinging on the respective elements, electric circuit means for recording the difference between the output signal of said main element and the output signal of the reference element, thereby compensating for variations in the intensity of said light source, the improvement comprising means for applying a compensating signal to said main element output signal, said compensating signal being applied in response to deviations from linearity of said main element output as a function of intensity of light impinging on said main element, whereby said compensating signal overcomes any lack of proportionality between the output of the main element during maximum light transmission through said sample means and during a low degree of light transmission when said sample means is substantially opaque due to the presence of material therein.

2. The photometric apparatus according to claim 1 wherein said recording means includes a variable resistance in electric circuit with said main element and a variable resistance in electric circuit with said reference element, said variable resistances each including a movable slider, said sliders each providing a source of voltage for comparison in said recording means, and said compensating signal means being connected to the output of one of said sliders.

3. The photometric apparatus according to claim 1 wherein said recording means includes a balancing motor driving a recorder and includes means for amplifying said output signal difference and transmitting the amplified signal to said motor, said compensating signal being applied between said photoelectric elements and said amplifying means.

4. The photometric apparatus according to claim 1 wherein said recording means includes resistances in circuit with said reference element, said reference circuit variable resistance including a potentiometer with a slider, said slider providing a source of voltage for comparison in said recording means, said compensating resistances being in parallel circuit with said potentiometer on opposite sides of said slider, whereby said compensating resistances provide a non-linear output signal at said slider.

References Cited

UNITED STATES PATENTS

| | | | |
|---|---|---|---|
| 3,446,972 | 5/1969 | Bentley et al. | 250—209 X |
| 2,435,175 | 1/1948 | Buc et al. | 250—204 |
| 2,960,910 | 11/1960 | Pelavin | 250—210 X |
| 3,028,499 | 4/1962 | Farrall | 250—212 X |
| 3,236,148 | 2/1966 | Pelavin | 250—218 X |
| 3,257,562 | 6/1966 | Erdman et al. | 250—218 X |
| 3,366,789 | 1/1968 | Allen | 250—212 X |

WALTER STOLWEIN, Primary Examiner

U.S. Cl. X.R.

356—206